Jan. 16, 1962 W. P. REID 3,016,562
GROMMET
Filed Sept. 8, 1958

INVENTOR.
WILLIAM P. REID
BY
Paul A. Weilein
ATTORNEY.

United States Patent Office 3,016,562
Patented Jan. 16, 1962

3,016,562
GROMMET
William P. Reid, 2610 E. 67th St., Long Beach, Calif.
Filed Sept. 8, 1958, Ser. No. 759,540
4 Claims. (Cl. 16—2)

This invention relates to grommets for installation in walls, bulkheads and similar members, as in aircraft and other structures, whereby a group of wires, a single wire or a conduit may be extended therethrough without chafing or other damage and will be safely supported therein.

It is an object of this invention to provide a grommet of the character described which is an improvement in this art in point of being composed of but two simply constructed parts that may be quickly and easily installed and securely locked in place without the use of a tool.

It is another object of the invention to provide a grommet such as described which is automatically locked in place incident to installation thereof, it being necessary to cut or rip portions of the grommet with a tool in a manner destroying the grommet in order to remove or dislodge it from locked position.

It is another object of this invention to provide a two piece grommet such as described which may be constructed of a plastic material having a low coefficient of friction, high tensile strength and ability to withstand extremely high and low temperatures without derangement or damage, for example, a polytetrafluoroethylene resin known as "Teflon" or a similar plastic material. With the grommet made of this material, wires, a wire, or a conduit or other element may be passed through the grommet without chafing or other impairment and will be supported therein in a manner preventing damage thereof under stresses and forces applied thereto.

It is another object of this invention to provide a two piece grommet such as described which achieves the objects and advantages herein noted through the instrumentality of a resilient split locking ring and an annular grommet body, the body having a circumferentially continuous axial bore. The split locking ring is subject to being contracted or collapsed with one hand and easily mounted in an opening in a bulkhead, wall or similar member so that when released, it will expand and cause flanges thereon to lock the ring in the opening. The grommet body and the ring are constructed so that the body may be forced into the bore of the locking ring in a manner causing the ring to be flexed while locked in the opening in which it is installed. Accordingly, when one end of the body is passed through the ring bore, the flexed ring will snap into position between radial flanges on the body, thereby locking the body in place.

The foregoing and other objects are achieved by the provision of a grommet, wherein the flanged and split locking ring such as described has a bore of greater diameter at one end than at the other end, and wherein the grommet body such as described has flanged ends with one flanged end of less diameter than the other and of greater diameter than the smaller end of the ring bore. With this construction of the ring and body, upon forcing the smaller flanged end of the body into the larger end of the ring bore and forcing the body through the bore of the ring, the ring will be flexed and expanded. Thus, when the smaller flanged end of the body passes through the smaller end of the ring bore, the flexed resilient ring will move with a snap action between the flanges on the body, with the opposite ends of the ring in such close engagement with the flanges on the body as to prevent dislodgement of the grommet.

It is an additional object of this invention to provide in a grommet such as described a construction of the split locking ring making it possible for the ring to be flexed or moved in the opening in which it is installed, while forcing the grommet body through the bore of the locking ring. This flexing of the locking ring may be provided for by making a portion of the outer periphery of the locking ring between the flanges of a diameter whereby such portion may be spaced from contact with the annular wall of the opening in which the ring is locked. In other words, a somewhat loose fit of the ring in the opening of the bulkhead or like member, will provide for the aforesaid flexing of the ring. As here shown however, the outer periphery of the portion of the ring between the flanges may be tapered in a manner so that only a small axial portion of the ring is engageable with the wall of the opening, while the remainder of the ring except the flanges is spaced from the wall of the opening.

Another object is to provide a grommet such as described wherein the locking ring for locking the body of the grommet in place, may have its bore formed with one end of greater diameter than the remainder of the bore, in any suitable manner, provided the body will cause the ring to be flexed and snap into locked engagement with the body when the latter is passed through the ring bore. One formation that has been found to be satisfactory is provided by tapering the bore of the ring from one end to the other so that the larger end will receive the smaller flanged end of the body in a manner causing the ring to be flexed when forcing the smaller end through the ring bore. When the ring bore is tapered in this manner the outer periphery of the ring may be correspondingly tapered for the purpose previously stated.

Another object is the provision in a grommet such as described, of a grommet body which in one size may be used with locking rings having locking flanges axially spaced various distances depending upon the thickness of the wall or bulkhead in which the grommet is to be installed, thereby only making it necessary to use a different locking ring for installing the grommet body in walls or bulkheads having different thicknesses over a wide range. With this arrangement the locking ring may be formed with one radial flange at one end thereof and with the other radial flange variously spaced from the other end of the ring depending upon the thickness of the bulkhead or wall in which the grommet is to be installed. When one flange is spaced from the adjacent end of the ring, this leaves one end portion of the ring in the form of a lip projecting axially from the flange and subject to ready flexure. Such a lip will snap into locking position abutting the adjacent end flange on the body and is resiliently urged radially inwardly against the outer periphery of the body in such a manner as to make it impossible to pry it from locking position without using a tool that would completely destroy the ring or the body.

This invention possesses many other advantages and has other objects which may be made more easily apparent from a consideration of the embodiment of the invention shown in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings.

As shown in the accompanying diagram a grommet embodying the present invention comprises a split locking ring 1 and an annular grommet body 2. The ring 1 is adapted to be mounted in an opening 3 in a bulkhead, wall or similar member 4 so that it is locked in place and will lock the body 2 therein when the latter is inserted into the bore of the ring.

The locking ring 1 may be made of a resilient and flexible material, for example, one of the plastics having a low coefficient of friction, high tensile strength and ability to withstand extremely high and low temperatures without impairment or failure. It has been found that a polytetrafluoroethylene resin, known as "Teflon" is well suited, although other materials having the qualities above noted may also be used. If desired, the body 2 may also be formed of a plastic material such as above noted, as it is provided with a smooth and circumferentially continuous axial bore whereby a bundle of wires, a single wire or a conduit or a similar element not shown, may be extended therethrough and supported therein without chafing or other impairment.

It is desired that the ring 1 and body 2 be capable of assembly quickly and easily without the use of tools. It is also desired that incident to the mounting of the ring 1 in the opening 3, the ring will be locked in place. Further, it is desired that incident to insertion of the body 2 into the bore of the ring 1, the body will be permanently locked in place in a manner precluding accidental removal thereof, it being necessary to use a tool such as would cut or rip and thus destroy the ring or body or both before removal of the grommet may be effected. With this locking provision, it is assured that the grommet will remain in place and reliably support the elements extended therethrough under all stresses and loads imposed thereon.

Figure 3:
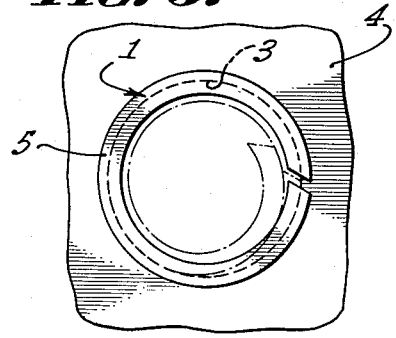
FIG. 3 is an elevational view of the locking ring as mounted in place in an opening in a bulkhead, and showing in dotted lines how it is collapsed in order to be mounted in the opening.

In order that the split ring 1 will be locked in place in the opening 3, the ring is provided with radial flanges 5 and 6 axially spaced thereon so as to abut opposite sides of the bulkhead or wall 4. In being resilient and flexible the ring 1 may be contracted or collapsed, as shown in FIG. 3, with one hand, so that it may be placed in the opening 3 and released in a manner causing it to spring into locked position with the flanges 5 and 6 abutting opposite faces of the bulkhead or wall. As here shown, the flange 5 is at one end of the ring whereas the flange 6 is spaced inwardly from the other end of the ring, whereby this end forms a flexible lip 7. However, in some instances depending upon the thickness of the wall or bulkhead, the flange 5 will be located nearer or at the adjacent end of the ring, in which latter case, there would be no flexible lip portion 7.

It is desired that the ring 1 be expanded while locked in the opening 3, when the body 2 is being inserted through the bore of the ring. This is necessary to assure that the ring and body 2 will interlock when the body is mounted in the bore of the ring. Accordingly, the ring 1 and body 2 are constructed so that the body 2 must be forced through the ring bore in a manner causing the aforesaid expansion of the ring. As here shown, the bore of the ring 1 is formed with one end or portion of greater diameter than the remainder of the bore and by having the portion of the ring between the flanges 5 and 6 of such diameter that the ring may be expanded in the opening 3.

As here shown, the bore of the ring 1 is tapered from the end of the bore at which the flange 5 is located to the other end, and the outer periphery of the ring 1 is correspondingly tapered. This taper of the outer periphery of the ring causes the portion of the outer periphery next adjacent the flange 5 to engage the wall of the opening 3 while the remainder of the outer periphery between the flanges 5 and 6 as shown in FIG. 5, is spaced from the wall of this opening.

The construction of the body 2 which makes it possible to expand the ring 1, consists in forming one end of the body of less overall diameter than the diameter of the larger end of the bore of the ring, but of greater diameter than the diameter of the smaller end of the bore of the ring. As here shown, the body 2 has radial flanges 8 and 9 at its ends with the flange 9 of less radial extent than flange 8, whereby one end of the body is of less overall diameter or smaller than the other. The space between the flanges 8 and 9 is approximately equal to the axial extent of the ring 1, whereby the ring will be seated between and engaged with the flanges 8 and 9 when the end of the body on which the shorter flange 9 is formed, is forced through the smaller end of the bore of the ring 1.

Figure 1:
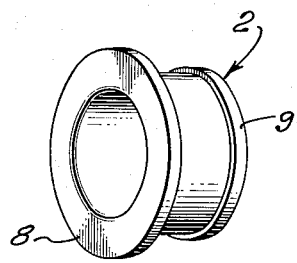
FIG. 1 is a perspective view of the body of a two piece grommet embodying the present invention.
Figure 2:
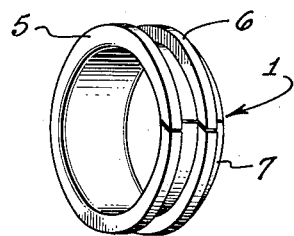
FIG. 2 is a perspective view of a split locking ring comprising the other part of the grommet.
Figure 4:
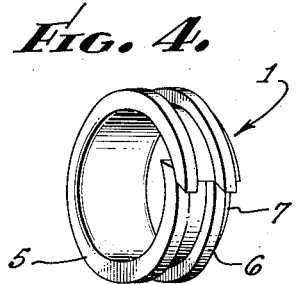
FIG. 4 is a perspective view showing how the split ring may be collapsed in order to be mounted in an opening in a bulkhead or similar member.
Figure 5:
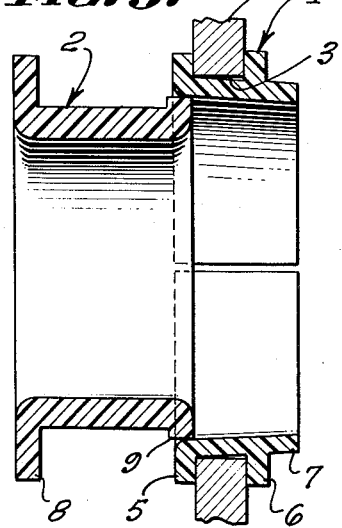
FIG. 5 is an enlarged sectional view showing how the body of the grommet may be inserted into the larger end of the tapered bore of the locking ring, preparatory to forcing the body through this bore.

In the operation of installing the grommet, the operator with one hand readily may collapse the split locking ring 1 sufficiently as shown in FIGS. 3 and 4 to place it in the opening 3 and release it so that the ring will expand into locking position with the flanges 5 and 6 as shown in FIG. 5, abutting the opposite faces of the bulkhead or wall.

Figure 6:
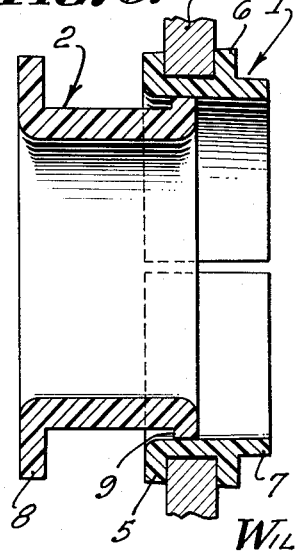
FIG. 6 is an enlarged sectional view corresponding to FIG. 4, showing the body of the grommet forced partly through the locking ring and how the ring is flexed and expanded during this operation.
Figure 7:
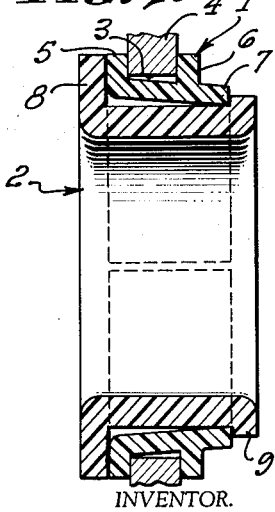
FIG. 7 is an enlarged sectional view corresponding to FIGS. 4 and 5, showing how the grommet body is locked in place in the locking ring to complete the installation of the grommet.

As shown in FIG. 5, the smaller end of the body 2 on which the shorter flange 9 is formed is placed in the larger end of the bore of the ring 1, and forced by hand through this bore. During this forcing of the smaller end of the body 2 through the ring bore, the ring is expanded as indicated in FIG. 6. When the flange 9 passes through the smaller end of the bore of the ring, the expanded end of the ring, in other words, the lip portion 7 as here shown, will move radially inwardly with a snap action behind and against the flange 9 while the other flange 8 on the body 2 will overlie the flange 5 on the ring as shown in FIG. 6, thereby locking the grommet in place.

Should the flange 6 on the ring be located at the adjacent end of the ring so that there is no lip portion 7, the end of the ring on which the flange 6 is formed will be urged behind the flange 9 on the body 2 for locking the latter in the ring. In all forms of the ring 1, one end thereof will be resiliently urged radially inwardly against the outer periphery of the body 2 behind and in engagement with the flange 9 on the latter, thereby assuring that the ring 1 will effectively lock the body 2 against dislodgement.

It is important to note that the grommet may be easily and quickly installed by hand, it being unnecessary to use a tool or tools. It is also important to note that the grommet is automatically permanently locked in place in a manner effectively resisting the prying of the locking ring 1 on the flanges of the body 2 out of locking position and making it necessary to use tools which would cut or rip and thereby destroy the grommet before it can be dislodged.

I claim:

1. A combination including a grommet and an annular body, the grommet comprising; an elongated longitudinally split resilient planar ring adapted to be mounted by planar compression in an opening in a supporting member; flanges on said ring engageable with opposite faces of said member to interlock said ring with said member incident to the mounting of the ring in said opening; an annular body insertable through said ring; said ring and body having surfaces, coengageable to spread the opposed ends of said ring and thus expand the ring while the ring is locked in said opening, upon forcing said body through said ring; and means on said body operable upon the forcing of said body through said ring to engage said ring, and lock said ring and body in said opening against displacement by forces applied endwise of said ring and body.

2. The combination grommet and annular body of claim 1, in which radial flanges on said body are operable to engage said ring to lock said body and ring in said opening in said member against displacement by forces applied endwise of said ring and body, when one end of said body is forced through said ring.

3. A combination including a grommet comprising: a split locking ring of resilient and flexible material adapted to be mounted in an opening in a member on which the grommet is to be installed; said ring having a tapered bore and a tapered outer periphery; said ring having radially extended flanges interrupted by the split in the ring axially spaced thereon; said ring being tensioned so that said flanges will be engaged with opposite faces of said member to lock the ring in said opening incident to the extension of said ring through said opening; said tapered outer periphery permitting additional expansion of said ring while said ring is locked in said opening; and an annular member having a circumferentially continuous bore and radially flanged ends; one of said flanged ends being of smaller diameter than the other and of smaller diameter than the larger end of said tapered bore but of greater diameter than the normal diameter of the remainder of said tapered bore; said annular member effecting said additional expansion of said ring in being forced into said tapered bore; the flanges on said ends of said annular member being axially spaced so that said ring will snap into position therebetween and in shouldered engagement therewith to lock said annular member in said ring, when said annular member passes through said tapered bore, the ring and body being locked in said opening against displacement by forces applied endwise of said ring and body.

4. A combination including a grommet comprising: a split locking ring of flexible and resilient material; for installation in an opening in a member on which the grommet is to be installed; said ring having a tapered bore therethrough and a correspondingly tapered outer periphery; radial flanges interrupted by the split in the ring axially spaced on said ring; said ring being tensioned so that said flanges will be engaged with opposite faces of said member to lock said ring in said opening incident to placement of said ring within said opening; one of said flanges being spaced axially inwardly from one end of said ring to form a lip at said one end of said ring; and an annular body having a circumferentially continuous axial bore therethrough; said body having flanged ends with the flanges extended radially therefrom; one flanged end of said body being of less diameter than the larger end of the bore of said ring and of greater diameter than the smaller end of the ring bore; whereby it may be forced into the ring bore so as to additionally expand said ring while the latter is locked in said opening; said lip moving with a snap action against one of the flanges on said body when said body is forced through the bore of said ring, the ring and body being locked in said opening against displacement by forces applied endwise of said ring and body.

References Cited in the file of this patent

UNITED STATES PATENTS

| 1,773,811 | Flachbartt | Aug. 26, 1930 |
| 2,340,423 | O'Shaughnessy et al. | Feb. 1, 1944 |
| 2,355,126 | Webster et al. | Aug. 8, 1944 |
| 2,514,504 | Moline | July 11, 1950 |